Dec. 8, 1942.                    F. L. GILLETT                    2,304,350
                                 ROTARY DRAWWORK
                               Filed March 3, 1941                3 Sheets-Sheet 1

Inventor
Frank L. Gillett
By
Lyon & Lyon
Attorneys

Inventor
Frank L. Gillett
By Lyon & Lyon
Attorney

Patented Dec. 8, 1942

2,304,350

UNITED STATES PATENT OFFICE 2,304,350

ROTARY DRAWWORKS

Frank L. Gillett, Inglewood, Calif., assignor to The National Supply Company, Pittsburgh, Pa., a corporation of Pennsylvania Application March 3, 1941, Serial No. 381,476

3 Claims. (Cl. 192—48)

This invention relates to rotary drawworks and more particularly to a rotary drawworks applicable for use in connection with a rotary drilling apparatus for the drilling of wells, i. e., oil, gas, or other wells. In the high speed drilling of wells it is an economic necessity that the drawworks as utilized be of such construction as to permit the rapid and efficient handling of the drill pipe, particularly as the same is withdrawn from, or lowered into, the well, as may be occasioned many times during such drilling operations due to the necessity of changing bits or other tools necessary in such drilling operation.

In the operation of such a drawworks construction, in order to effect the quick changes of direction of operation required in such hoisting operations, it is desirable to employ a friction type clutch drive to the drum shaft. However, due to the extremely heavy loads placed upon such an operating mechanism, it is well known that such friction type structures, even though they be of the most advanced form of construction, are subject to very rapid wear and failure because of such wear, leaving the hoisting mechanism in a condition where it either will not operate or because of the extremely heavy loads, is not of safe operation.

It is therefore an object of this invention to provide a drawworks construction wherein a friction type clutch means is employed for transmitting the drive to the hoisting drum, and wherein means are provided which will permit the formation of a positive drive connection when required or desired, or where the torque required or desired to be transmitted exceeds the capacity of the friction clutch or where, for one reason or another, it is necessary or desirable to replace or repair the friction clutch means.

Another object of this invention is to provide a rotary drawworks including a friction disc type clutch drive to the hoisting drum, which friction type clutch is of the pneumatically operated type and wherein means are provided which permit the formation of a positive drive in place of the said friction drive when for any reason it is desired or required to be utilized.

Another object of this invention is to provide a disc type friction clutch having a centrally arranged fluid operated piston for the moving of the friction members into engagement and wherein a positive driving connection is provided operable in the absence of the piston and the disc to drive that part of the clutch normally driven through the friction elements.

Another object of this invention is to provide a friction disc type clutch wherein the bearing supports for the rotatable member are so mounted and positioned as to avoid disturbance thereof upon removal of the friction discs or plates.

Other objects and advantages of this invention it is believed will be apparent from the following detailed description of a preferred embodiment thereof as illustrated in the accompanying drawings.

Figures 1, 5:
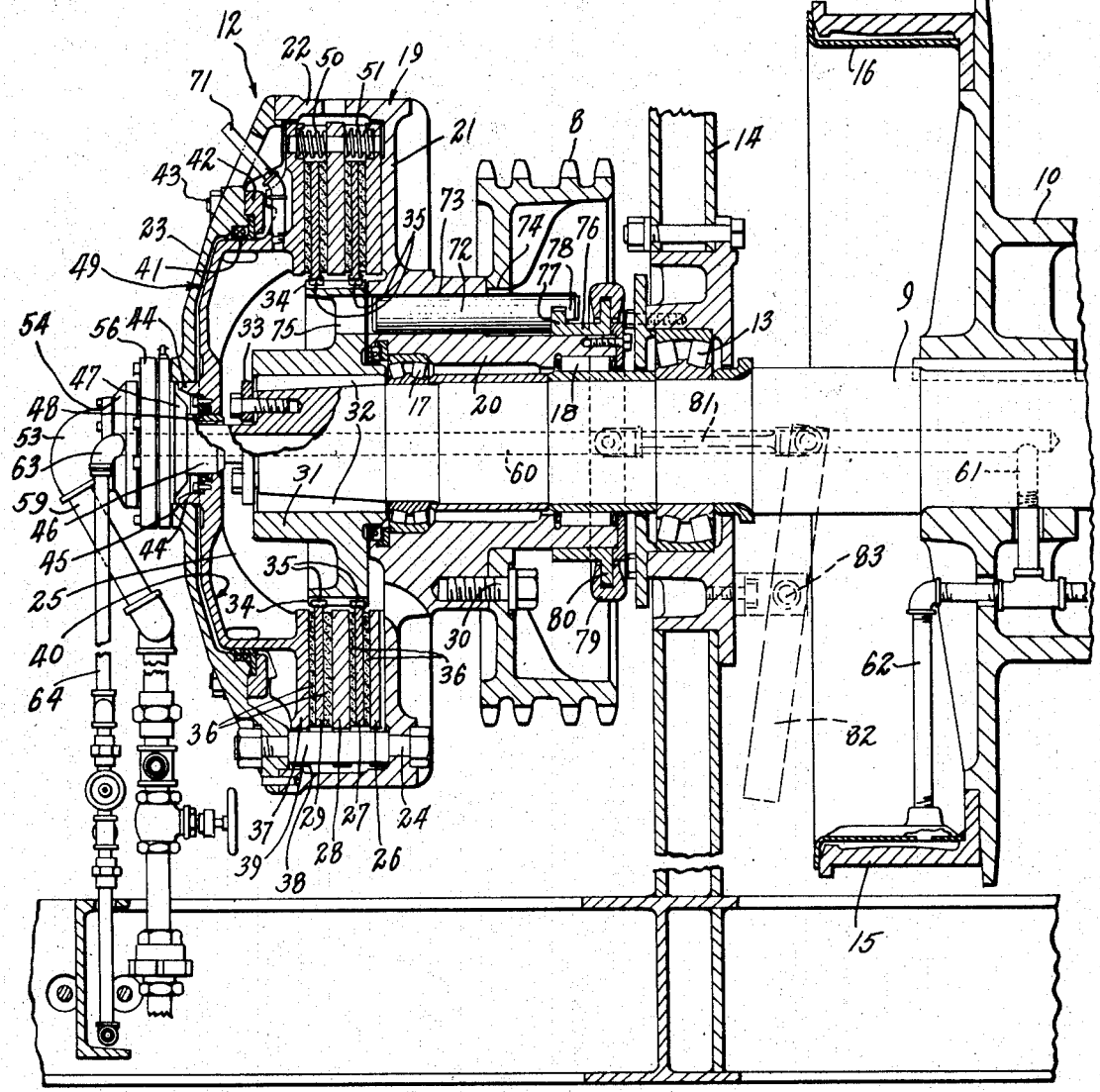
Figure 1 is a sectional elevation of a clutch structure embodying my invention illustrating the same as applied to a drawworks hoisting drum shown fragmentally and in section.
Figure 5 is a diagrammatic view of a rotary drilling rig illustrating my invention.
Figure 2:
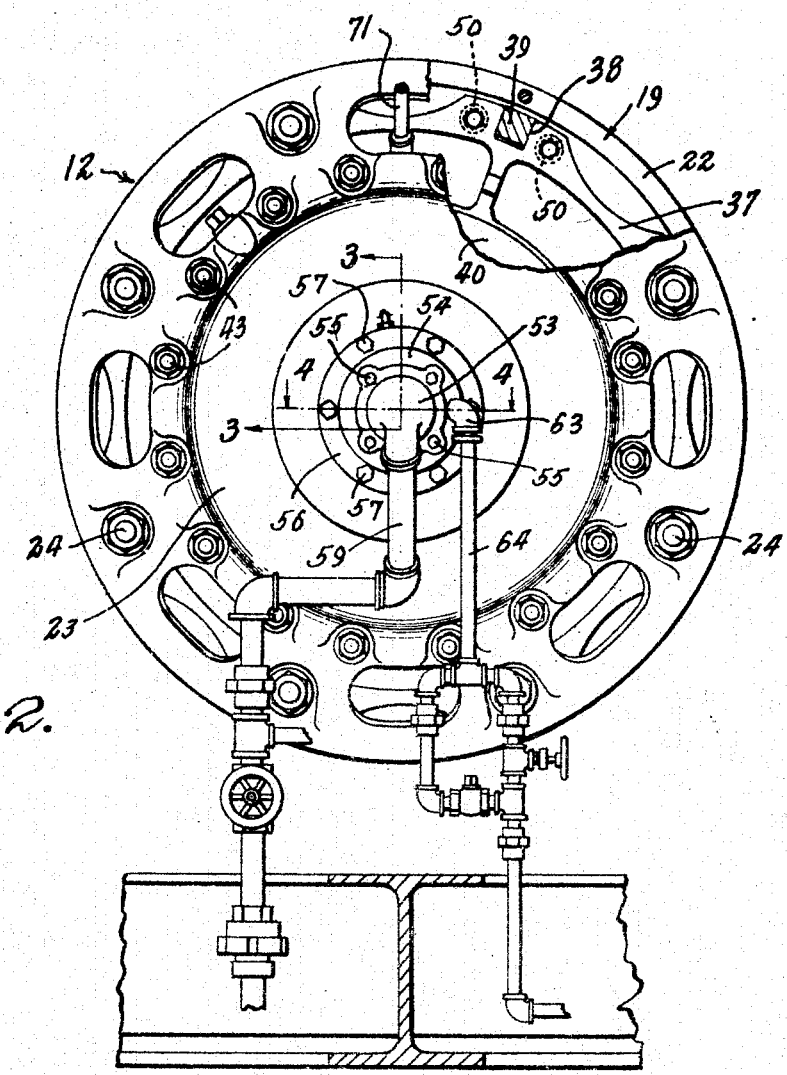
Figure 2 is an end view partly in vertical section thereof.
Figure 3:
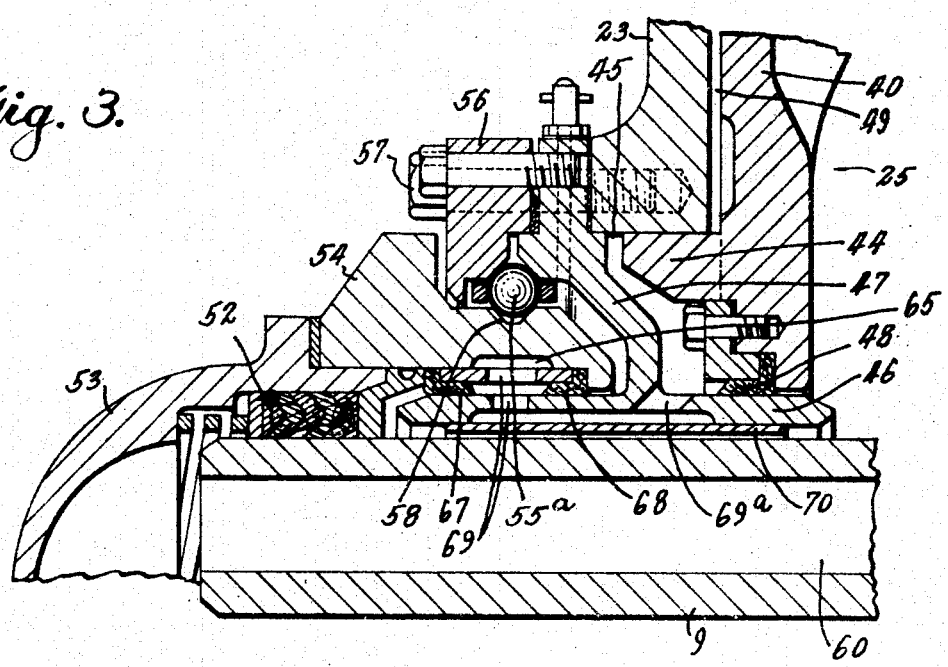
Figure 3 is an enlarged fragmental section taken substantially on the line 3—3 of Figure 2.
Figure 4:
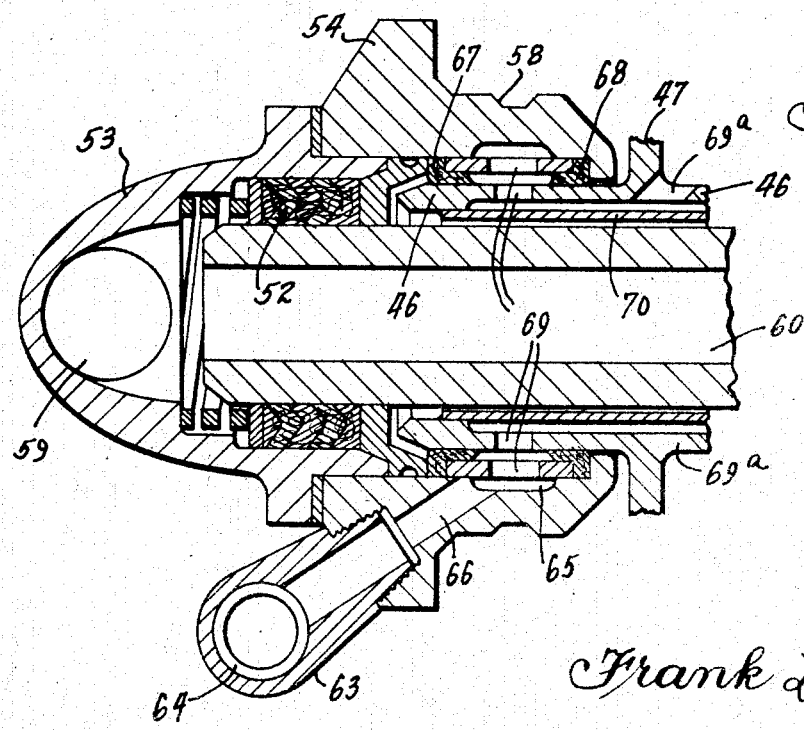
Figure 4 is a fragmental enlarged sectional view taken substantially on the line 4—4 of Figure 2.

In the preferred embodiment of my invention as illustrated in the accompanying drawings, the rotary drilling rig includes a drilling or rotary machine 1, a drawworks 2, and a power transmission element 3. The power transmission unit 3 may be of any suitable or desirable form of construction for the transmission of power from any suitable or desirable source to the line shaft 4 of the drawworks 2 so as to enable said shaft 4 to be driven at a number of different speeds.

As is common in such structures, the line shaft 4 is provided with a power transmission connection 5 for the driving of the rotary machine 1 thus permitting the rotary machine 1 to be driven at the same number of speeds as the line shaft 4 is driven.

A power transmission connection 6, including a multiple chain sprocket 7, is mounted on the line shaft 4 to drive a corresponding multiple chain sprocket 8 mounted upon the drum shaft 9. The drum shaft 9 carries a spooling drum 10 over which a line 11 is trained. The line 11 normally passes over the crown block (not shown) and through the necessary blocks (also not shown) for supporting the drill pipe as it is lowered through, and as it is driven by, the rotary machine 1.

In order to effect a driving connection to the drum 10 which, in this case, is rigidly mounted to the drum shaft 9, a friction type and positive type clutch 12 embodying my invention is provided. By the use of this friction type clutch in this organization I am enabled to effect a quick change of speed of drive of the line 11, and should the friction means for any reason fail, I am enabled to utilize the positive drive provided through the said element 12 to effect the driving connection between the sprocket 8 and the drum 10 so that the drilling operations are not required to be discontinued during replacement or repair of the friction elements.

The use of this positive type connection also permits me to drive the drum 10 under torque conditions which could not be transmitted through the friction elements. This is particularly important in structures of this type because it often occurs that the drill pipe becomes "stuck" in the well requiring great forces to be transmitted to the line 11 in an effort to dislodge the drill pipe and permit either its raising or lowering as desired in the well being drilled.

Other conditions requiring high torque transmission are also met in such drilling operations wherein a friction type drive will not permit the transmission of the required torque in order to carry out the operations. The normal use, however, of the positive type drives is not desirable under the high speed operations required because positive drives require the stopping of the mechanisms in order to permit their being shifted into and out of engagement, which operations slow up the drilling operations to such an extent as to make their normal use inadvisable.

In accordance with my invention, the drum shaft 9 is supported between spaced bearings 13 upon spaced supporting structures 14, only one of which bearings and supporting structures is shown, as said supports are well understood in this art.

The drum 10 is provided with brake flanges 15 at either end of the drum as each of these brake flanges 15 is provided with an inner shell 16 for the circulation of a cooling fluid against their inner periphery. The cooling fluid (usually water) is introduced into one end of the drum shaft 9, and after passing through the brake flange chambers as thus provided, is discharged through the other end of the drum shaft in any suitable manner as, for example, illustrated in the Spalding Patent No. 1,918,501, granted July 18, 1933.

In accordance with my invention, the drum shaft 9 extends beyond the supporting bearing 13 at one end of the structure and upon this overhanging portion axially aligned spaced roller bearings 17 and 18 are mounted.

A clutch housing 19 of bell shape is rotatably supported by its sleeve portion 20 upon the bearings 17 and 18. The bell-shaped clutch housing 19 as herein illustrated includes the sleeve portion 20, a radially extending wall 21, and a shell portion 22 to which latter section a cover member 23 is secured as by means of the through-bolts 24. The bell-shaped housing provides an annular chamber 25 around the drum shaft 9. Within this chamber are mounted the friction discs 26, 27, 28 and 29.

The multiple chain sprocket 8 is secured to the housing 19 by means of cap screws 30. A hub member 31 is secured to the shaft 9 by means of keys 32 and a collar 33. The hub member is provided on its periphery with a series of external spline teeth 34. The friction discs 27 and 29 are provided with internal spline teeth 35 adapted to interengage with the spline teeth 34 whereby the said discs 27 and 29 rotate with the hub 31 and may have axial movement therealong. The discs 27 and 29 are provided with friction lining 36. Discs 26 and 28 and the clamping plate 37 are provided with peripheral notches 38 for engaging the square portion 39 of the through-bolts 24 so that the discs 26 and 28 and plate 37 rotate with the housing 19 and may have axial movement with respect thereto. Formed integral with the clamping plate 37 is an annular piston 40.

Means are provided including a packing ring 41 held in position by means of a follower 42 and bolts 43 provide a seal between the piston 40 and the cover 23. The piston member 40 is provided with a plurality of lugs 44 fitting within an axial bore 45 in the cover 23 to assist the follower 42 in maintaining the piston member 40 concentric with the shaft 9 and housing 19.

A tubular member 46 is mounted at the end of the shaft 9 and projects through the central opening of the piston 40. The tubular member 46 is provided with a radially extending flange 47 which is secured to the cover 23 in fluid tight relation.

Sealing means 48 are interpositioned between the tubular member 46 and the piston 40. The sealing means 48 and 41 form the inner and outer boundaries respectively of an annular chamber 49 defined between the cover 23 and the piston 40. When fluid under pressure is admitted into this chamber 49, the piston 40 is moved axially, causing the clamping plate 37 to move toward the radial wall 21 to bring the friction discs 26, 27, 28 and 29 into frictional engagement. A friction drive is thus established between the driven sprocket 8 and the shaft 9. When the supply of fluid under pressure is relaxed, the springs 50 and 51 release the frictional engagement between the discs.

The shaft 9 projects beyond the hub 31 and through the central bore of the tubular member 46.

A spring-loaded packing assembly 52 encircles the outer end of the shaft 9 and fits within an elbow 53. The elbow 53 is secured to a stationary ring 54 by means of cap screws 55. The stationary ring 54 is held in place by means of a ball-bearing assembly 55ª.

A ring 56 and the flange 47 of the tubular element 46 are both secured to the cover 23 by means of cap screws 57. The ring 56 and the flange 47 cooperate to define a split outer race for the ball-bearing assembly 55ª and a groove 58 formed in the stationary ring 54 defines the inner bearing race. This construction provides a means for maintaining the stationary ring 54 concentric with the shaft 9 and the housing 19.

The means provided for supplying the cooling fluid for the cooling chambers of the brake rims 15 includes the elbow 53 leading from a supply pipe 59 into the longitudinal passageway 60 of the shaft 9. The packing assembly 52 prevents leakage at the point where the stationary elbow 53 meets the rotary shaft 9. The shaft 9 is provided with a lateral branch 61 which leads to piping 62 to the said brake rim chambers.

Means are provided for supplying fluid under pressure for actuation of the piston 40 of the friction clutch. This means as herein illustrated includes an elbow 63 connected with a fluid supply line 64. The elbow 63 is secured to the stationary ring 54 and communicates with an annular recess 65 by way of a port 66.

Sealing rings 67 and 68 encircle the outwardly projecting portion of the tubular element 46 and thereby form spaced rotary seals between the stationary ring 54 and the tubular element 46. Between the sealing rings 67 and 68 there is provided a plurality of ports 69 formed through the wall of the tubular element 46. A second series of ports 69ª are formed through the wall of the tubular element 46 on the opposite side of the flange 47 and a sleeve 70 fixed within the bore of the tubular element 46 places ports 69 and 69ª in direct communication. In this construction fluid pressure which enters the annular space 65 passes inwardly between the sealing rings 67 and 68, through the ports 69, around the sleeve 70, and out through the port 69ª. The fluid under pressure then passes radially outwardly between the lugs 44 and may thus act over the entire area of the piston 40 between the sealing rings 48 and 41.

A vent pipe means 71 is provided for venting the space behind the piston 40 to the atmosphere and providing a passage through which foreign matter under the influence of centrifugal force may be discharged from the chamber 25. Means are provided whereby a positive drive connection may be established between the sprocket 8 and shaft 9 acting through the hub member 31 when such positive connection is desired or required.

The means provided for establishing this positive connection includes a plurality of drive pins 72 which are mounted in horizontal position to slide in bores 73 formed in the housing 19 and through apertures 74 formed in the structure of the sprocket 8. Mating apertures 75 are formed in the hub member 31 to receive the pins 72. Means are provided for longitudinally shifting the pins 72, including a shifting ring 76 having a flange 77 over which the hook ends 78 and pins 72 are engaged.

A clutch shifter collar 79 engages over a flange 80 on shifter ring 76 for shifting the ring and pins in a direction longitudinal to the shaft 9 and into and out of engagement within the apertures 75 formed in the hub member 31. The shifter collar 79 is connected by means of the rods 81 with a shifter lever 82 pivotally supported as indicated at 83 upon the housing for the bearings 13.

In operation the normal driving connection between the sprocket 8 and shaft 9 to the drum 10 is provided through the frictional engagement of the driving discs 26, 27, 28, 29 and 37. When it is desired to remove these plates for replacing the lining or for other reasons of repair, the cover 23 may be removed by removal of the through-bolts 24 and the means which couple the elbows 53 and 63 to the stationary ring 54. This permits removal of the piston 40 and friction plates.

It will thus be observed that the friction clutch means may be completely disassembled for repair or replacement as desired, leaving the means for providing a positive drive between the sprocket 8, shaft 9, and clutch 10 intact so that the hoisting mechanism may be utilized even while such repair is being undertaken.

It will also be apparent from the foregoing that when a torque is required to be transmitted from the sprocket 8 to the drum 9 to apply a tension to the line 11 greater than that which could be transmitted through the structure of the friction clutch, the pins 72 may be moved into position to provide a positive drive permitting the transmission of the said torque as may be required for imparting the necessary tension to the line 11 as may be required when the drill pipe or other tools being utilized become stuck or wedged in the hole being drilled.

Having fully described my invention, it is to be understood that I do not wish to be limited to the details herein set forth, but my invention is of the full scope of the appended claims.

I claim:

1. In a device of the class described, the combination of a shaft, a hub fixed on the shaft, a pair of spaced roller bearings supported on the shaft both on the same side of the hub, a member mounted on said spaced roller bearings for rotation relative to the shaft and being provided with a radially extending wall element, a friction disk slidably and non-rotatably mounted on the hub, an axially movable clamping plate on said member adapted to clamp the friction disk between the radially extending wall element and the plate, whereby a frictional driving connection may be established between the member and the hub, actuating means for said clamping plate, means whereby the friction disk, clamping plate and actuating means may be removed axially from said member independently of said hub and said wall, and means including a movable element and a cooperating abutment adapted to effect a positive driving engagement between said member and the hub.

2. In a device of the class described, the combination of a shaft, a hub member secured upon the shaft and provided with an annular series of external spline teeth, a driving member rotatably mounted upon the shaft having a radial wall and an axially extending shell encircling the hub member, a friction disk carried by said hub member within said shell and having internal splines cooperating with the spline teeth on the hub member, a movable plate carried on the driving member and adapted to clamp the friction disk between the plate and said radial wall whereby a frictional driving connection is established between said members, actuating means for said movable plate, means whereby the friction disk, movable plate and actuating means may be removed axially from said driving member independently of said hub member and said radial wall, and mechanical means for effecting a positive driving engagement between said members, said means including an axially slidable element carried on one member and adapted to be engaged with a corresponding abutment on the other member.

3. In a device of the class described, having a rotatably mounted shaft with an overhanging end extending beyond one of its supporting bearings, the combination of a hub member fixed on the overhanging portion of the shaft, a pair of spaced roller bearings supported on said shaft between the hub member and the shaft bearing, a driving member mounted on said spaced roller bearings for rotation relative to the shaft, releasable mechanical means for effecting a positive driving engagement between said members, said means including an axially slidable element carried on one of said members and adapted to be engaged with a corresponding abutment on the other member, a pair of friction disks encircling the hub member and each splined to one of said members, means adapted to bring said disks into frictional engagement with each other to establish a frictional driving connection between said members, said means including a fluid operated piston and cylinder supported by the driving member centrally of the shaft, the piston having a substantial portion thereof positioned on the opposite side of the hub member from said spaced roller bearings, and means whereby the friction disks, piston and cylinder may be removed axially from said driving member independently of the hub member and said mechanical means.

FRANK L. GILLETT.